No. 628,650. Patented July 11, 1899.
J. L. CREVELING.
ELECTRIC LIGHTING SYSTEM FOR CARS.
(Application filed Jan. 31, 1899.)
(No Model.) 3 Sheets—Sheet 1.
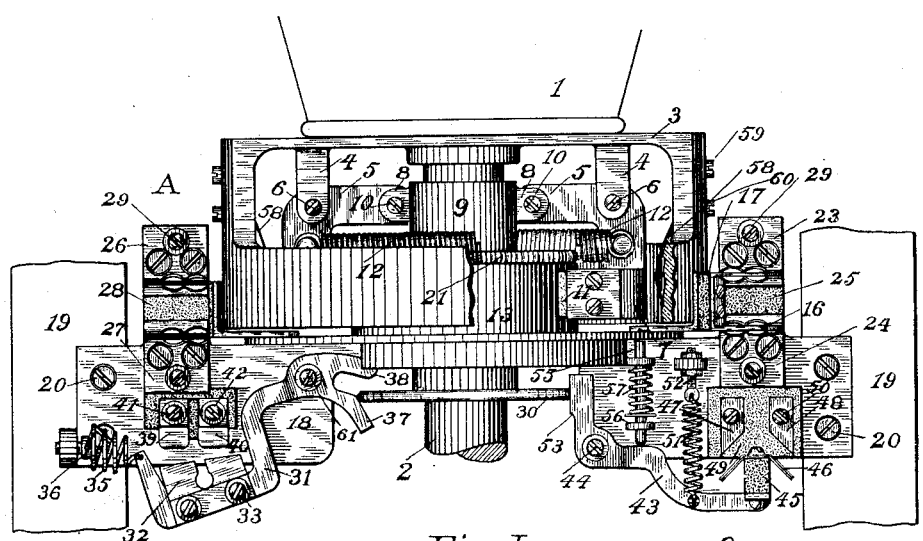
Fig. I.
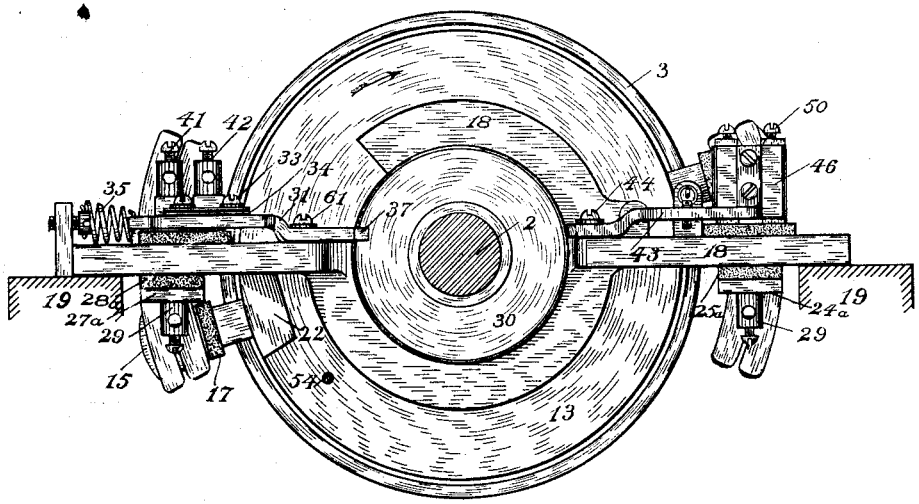
Fig. II
WITNESSES: INVENTOR No. 628,650. Patented July 11, 1899.
J. L. CREVELING.
ELECTRIC LIGHTING SYSTEM FOR CARS.
(Application filed Jan. 31, 1899.)
(No Model.) 3 Sheets—Sheet 2.
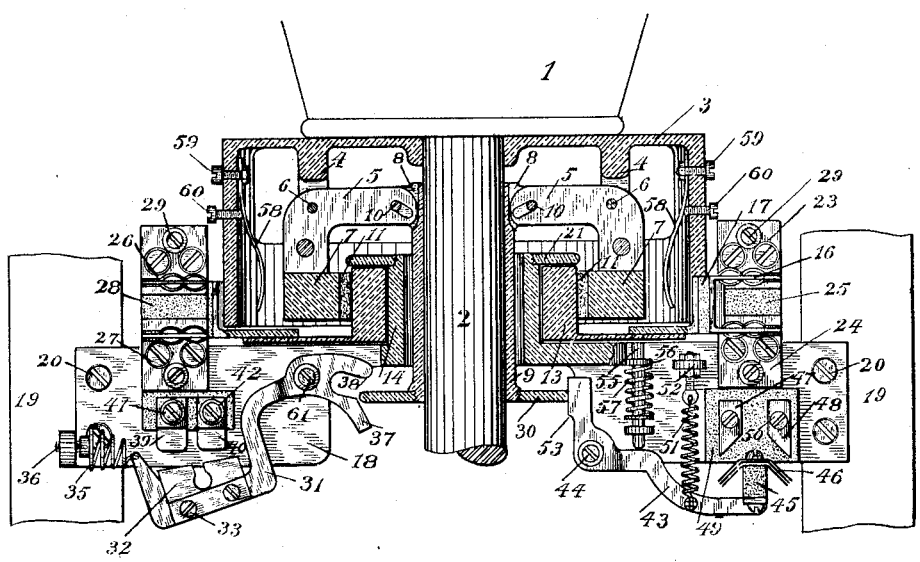
Fig. III.
WITNESSES: INVENTOR

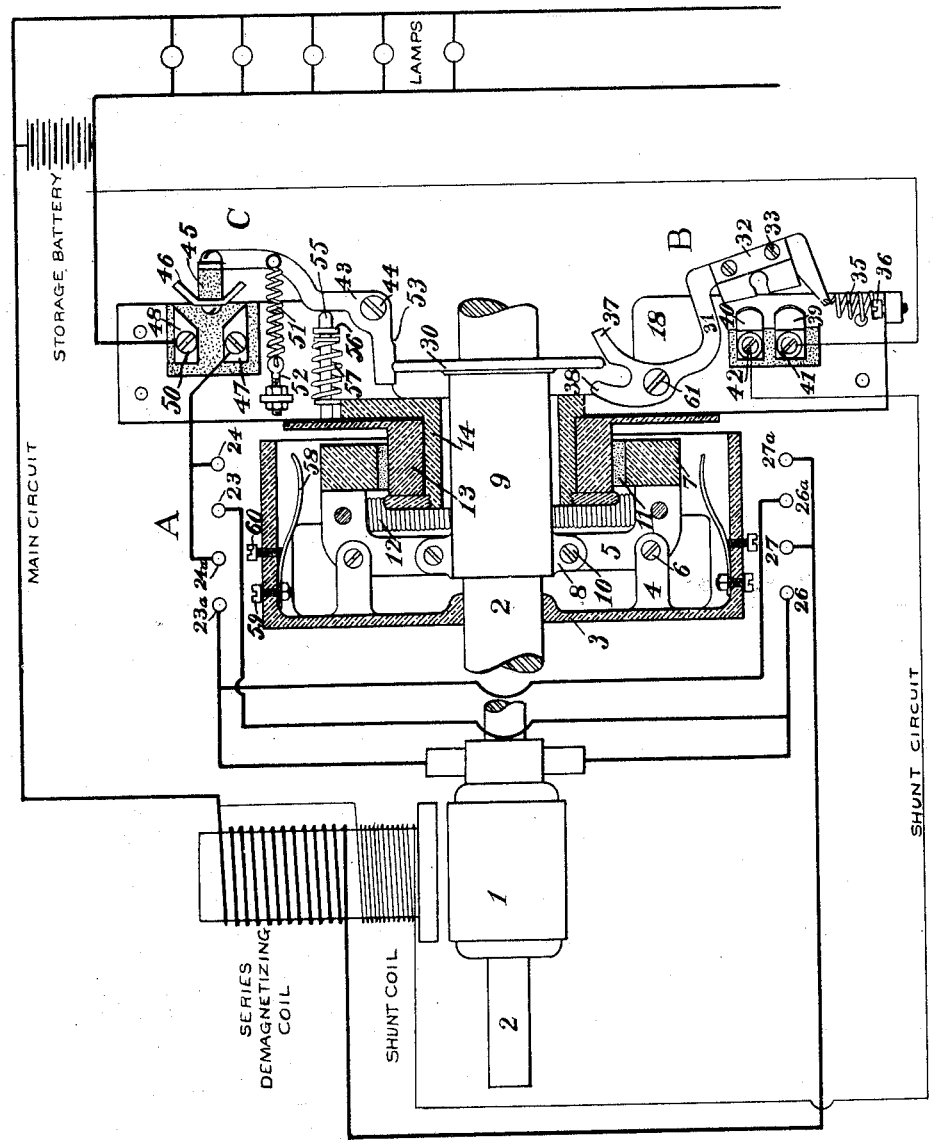

UNITED STATES PATENT OFFICE.

JOHN L. CREVELING, OF NEW YORK, N. Y.

ELECTRIC-LIGHTING SYSTEM FOR CARS.

SPECIFICATION forming part of Letters Patent No. 628,650, dated July 11, 1899.

Application filed January 31, 1899. Serial No. 703,966. (No model.)

*To all whom it may concern:*

Be it known that I, JOHN L. CREVELING, a citizen of the United States, residing at New York, county of New York, State of New York, have invented new and useful Improvements in Electric-Lighting Systems for Cars, of which the following is a specification, reference being had to the accompanying drawings, forming part thereof.

My invention pertains to a system of lighting cars by electricity generated by power taken from some rotating member the rotation of which is dependent upon the motion of the train—as, for example, the car-axle. Inasmuch as any such member is necessarily subject to varying speed of rotation, stoppage, and even reversal, it becomes necessary to provide means of maintaining practically steady voltage regardless of the speed above a critical point and to provide means of maintaining the lights while the speed shall be below this point. In order to keep a practically constant pressure upon the lamps and other devices, I have used a self-regulating dynamo of the compound type having the series coils in opposition to the shunt or energizing coils, and to maintain the lights during stoppage or before the generator has reached the critical speed I have employed storage batteries or accumulators. Since the self-regulating dynamo and storage battery are merely elements used in my system and form no part of my present invention, further description is omitted, any of the well-known types being applicable. It may readily be seen that in a system of this class in which the speed is variable, intermittent, and reversible it is advantageous to have the dynamo begin to generate immediately at a predetermined speed without having to wait for the usual process of priming, that it is necessary on account of the storage battery to have some means by which the direction of the current supplied to the mains shall not reverse with the reversal of rotation of the armature, and that the circuit between the armature and the battery shall be completed when the dynamo shall have obtained a required voltage and broken when the voltage shall have fallen below that of the battery, lest the battery discharge back through the generator.

My invention comprehends means whereby the current from the battery is allowed to flow through the shunt-coils of the generator when the armature shall have reached a desired speed, causing the dynamo to generate immediately; means of automatically breaking this exciting-circuit when the speed shall have fallen below a certain limit, thus avoiding waste of current when still or running at a low speed; means whereby the polarity of the current in the mains shall be held constant regardless of the direction of the rotation of the armature, and means whereby the circuit between the armature and battery shall be completed when the speed and consequent voltage of the dynamo shall have reached a desired degree and broken when the speed and dependent voltage shall have fallen to a certain degree.

In the drawings, Figure I shows a plan view of one form of my invention as at present employed by me, a portion being broken away to show the underlying parts. Fig. II shows an elevation of the same. Fig. III shows a partial section of the apparatus shown in Figs. I and II, giving in detail the construction of various parts. Fig. IV shows a diagrammatic view of the apparatus shown in Figs. I, II, and III, together with a generator, battery, and translating devices connected in such manner as to illustrate a system to which my invention is applicable.

The entire pole-changing switch, the exciting-circuit or shunt switch, and the armature-circuit or main switch have, for the sake of convenience when speaking of the entire switches, been given the letters A, B, and C, respectively, while the various parts are designated in detail by the numerals, like letters and like numerals in the several figures referring to like parts.

In the drawings, particularly in Figs. I, II, and III, 1 represents a portion of the armature of the dynamo, which may be of any suitable type, and 2 the armature-shaft, provided with suitable bearings. (Not shown.)

3 is a metal shell mounted upon the shaft 2 and revolving therewith and is provided with bosses 4, arranged to support the levers 5, pivoted, as by the screws 6. To one extremity of the levers 5 are attached the weights 7, while the opposite ends of the levers are attached to the bosses 8 of the sleeve 9, (which is free to slide along the shaft 2,) as by the screw 10, in such manner that motion given to the weights shall be transmitted to the sleeve 9. The inner surfaces of the weight 7 are provided with the leather shoes 11, which by the action of the springs 12 are normally held in contact with the surface of the cylindrical portion of the piece 13, which is revolubly mounted upon the sleeve 14 and carries the contact-pieces 15 and 16, which are insulated therefrom by the member 17. The sleeve 14 is a part of the main frame 18, which supports the portions of the apparatus which are not carried by the shaft 2, and is attached preferably to some portion of the generator, (indicated by 19,) as by the screws 20, and in such manner that the center of the bore of the sleeve 14 shall coincide with the center of the shaft. The movable member 13 is held in place upon sleeve 14 by means of the collar 21 and has the contact-pieces 15 and 16 so placed that when in one extreme position, as determined by the stop 22, if striking either one side or the other of the frame 18 they will cause electrical connection between the pair of terminals 23 and 24, mounted upon the insulating-block 25, and between the pair of terminals $26^a$ and $27^a$, mounted upon the insulating-block $28^a$, the pairs of terminals $23^a$ and $24^a$ and $26^a$ and $27^a$ being arranged on the under side of the frame 18, similar to the terminals 23 and 24 and 26 and 27 upon the upper side, one only of each pair of the under ones showing in the drawings. Should the piece 13 be revolved until the knives are in the other extreme position, the above-noted connections will be broken and connection will be established between the terminals 26 and 27, mounted upon the insulating-block 28, and between $23^a$ and $24^a$, mounted upon the block $25^a$.

Each of the above-mentioned terminals is provided with a binding-post 29 for the reception of conductors, and it will be plain to one skilled in the art that if properly connected this switch may be made to fulfil the office of a pole-changer and that if the springs 12 have the proper strength the friction between the shoes 11 and member 13 will cause the position of the knives 15 and 16 to depend upon the direction of rotation of the armature, thus reversing the poles of the generator to correspond to the reversal of rotation. The sleeve 9 carries the flange or disk 30, which is subject to any motion given to the sleeve.

31 represents a switch-lever pivotally supported, as by the screw 61, carrying the knife or contact-strip 32, fastened thereon, as by the screws 33, and insulated therefrom, as by bushings and strips 34. This switch-lever is provided at one end with the spring 35, adjustable, as by the screw 36, and at the other end with the two fingers 37 and 38, so arranged that when the disk 30 shall travel along the shaft 22 from the position shown in the drawings it may by its contact with 37 cause the lever 31 to be moved past a certain point where the spring 35 will force the knife 32 into the contacts 39 and 40, causing electrical connection between them, and if the flange then be moved back its contact with 38 may cause the lever 31 to be moved past the point where the spring 33 will cause the switch to open quickly and positively owing to the influence of the spring and the lost motion between the flange 30 and the fingers 37 and 38, thus preventing the current arcing across the switch in case the movement of the flange 30 be slow. The contacts 39 and 40 are insulated and provided with the binding-posts 41 and 42 for the reception of wires, and thus it is obvious that the completion of the shunt-circuit may depend upon the action of this switch. The lever 43 is pivotally supported upon the frame 18, as by the screw 44, and is provided at one end with the insulating member 45, carrying the contact-strips 46.

47 and 48 are terminals mounted upon the insulating-block 49 and provided with screws 50 for the attachment of wires thereto. The spring 51, adjustable, as by the screw 52, and the contact-strips 46 are so disposed that the spring tends to bring the lever 43 in such position that the strips 46 shall cause electrical connection between the terminals 47 and 48, while the position of the lever is dependent upon the position of the disk 30, owing to the shape of the lever 43, which is so constructed that when the disk 30 is in the position shown in the drawings, contact between 46, 47, and 48 is broken, and when the disk is moved along the shaft until passing the shoulder 53 the lever no longer rests upon the disk, thus allowing the spring to close the switch. The flange of the member 13 is provided with two holes 54, (one only of which is shown,) which when the knives 15 and 16 are in either of their extreme positions register with the pin 55, supported by the bosses 56 and held in contact with the lever 43 by means of the spring 57.

The motion of the sleeve 9 and disk 30 along the shaft 2 is dependent upon the movement of the weights 7, which when caused to revolve at the proper speed leave the surface of the member 13 and approach the annular portion of the shell 3 owing to the action of centrifugal force. The speed at which they shall leave the surface of the pole-changing member and shall cause the switch B to close does not require careful adjustment and is determined by the spiral springs 12; but the particular speed at which the switch C shall close should be between certain limits and is therefore made adjustable, as by means of the springs 58, held in position by the screws 59 and adjustable by the screws 60.

The practical operation of my improved system is as follows: Reference being had particularly to Fig. IV, in which figure the terminals 23 and 24, $23^a$ and $24^a$, 26 and 27, and $26^a$ and $27^a$ are shown diagrammatically in the same plane and the knives 15 and 16 have been omitted, the connections between the respectively-numbered terminals being taken as shown clearly in Figs. I, II, and III, starting with the car at rest and the lamps being supplied by the battery and the switches in the position shown in the drawings, as soon as the car starts the armature 1 and shaft 2 will be caused to revolve in the direction corresponding to the motion of the car. If the car start in the direction to cause the armature to revolve in the direction indicated by the arrow in Fig. II, the shoes 11 will revolve in contact with the piece 13, the pole-changing member 13 remaining in the position shown in the drawings, establishing connection between terminals 23 and 24 and between $26^a$ and $27^a$, which are so coupled up as to supply the current at the proper polarity to the mains when the armature shall revolve in this direction. However, if the car start in the opposite direction the frictional contact between the shoes 11 and the cylindrical portion of the member 13 will cause the latter member to be revolved in the direction of rotation of the armature until the stop 22 strikes the opposite side of the frame 18, when the knives will be in the other extreme position, establishing connection between the terminals 26 and 27 and the terminals $23^a$ and $24^a$, properly connected to reverse the mains for the reversal of rotation of the armature. Thus it is obvious that before the dynamo begins to generate the pole-changing switch A will have made the proper connections corresponding to the direction of rotation of the armature. Now if the speed of the armature increase, centrifugal force will cause the weights 7 to leave the surface of the piece 13, preventing the wear which would otherwise occur as soon as the armature reached any appreciable speed. Inasmuch as contact between the shoes and the switch is not needed after the switch is revolved into the proper position, I prefer to make the weights 7 comparatively heavy, so as to render it possible to have a fairly strong spring, insuring good contact between the shoe and the member 13, and still have the contact broken at a comparatively low speed, and find that the wear upon the shoes and switch member under such conditions is negligible. If the speed of the armature shall increase until approximating the critical speed, the weights will separate until resting against the springs 58 and the movement of the disk 30 will cause the lever 31 to close the switch B and allow the current to flow from the battery through the shunt-coils of the generator, causing it to be capable of generating immediately. This switch is adjusted to close while the armature is revolving at a speed a little too low to have a voltage equal to that of the battery, the voltage of the generator at this speed of course varying with the voltage of the battery to be charged, inasmuch as this same battery supplies the exciting-current to the shunt. The fingers 37 and 38 are so formed that they are in contact with the disk 30 only while the disk is moving the lever from one position to another. When the disk is in such position as to have closed the switch, the spring 35 causes the finger 37 to leave the surface of the disk, thus preventing wear between the two members and avoiding the finger 37, limiting the travel of the disk. Now if the speed of the armature reached the critical point the springs 58 will be overpowered by centrifugal force and the sleeve 9 will travel outward, causing the disk 30 to move past the shoulder 53. The pole-changing switch being in the extreme position, one of the holes 54 will register with the pin 55, and the spring 51 will cause the switch C to close the armature-circuit through the battery, allowing the current from the generator to be supplied to the battery and lamps. After the disk passes the shoulder 53 it is no longer in contact with the lever, thus preventing all wear after reaching the critical speed. The closing of the switch C will cause the pin 55 to engage the hole 54, thus preventing any shock or vibration causing the pole-changer to open. As long as the speed remains above the critical point the generator will continue to supply current to the battery-mains; but if the speed fall below this point the main switch C will open at a speed when little or no current is flowing through the contact-strips 46, thus without danger of arcing, and will allow the spring 57 to withdraw the pin 55, leaving the member 13 free to be revolved. Should the speed again reach the critical point, the switch C would again close, as outlined above; but if it fall still lower the disk 30 will move the finger 38, so as to cause the spring 35 to open the switch B with a snap movement, breaking the shunt-circuit and preventing an arc, which would be apt to be established if the switch opened as slowly as the speed of the train would fall. If the speed still fall, the shoes 11 will be brought in contact with the member 13, thus holding the pole-changing switch in proper position for the direction of rotation. Should the speed of the car increase, or should the car stop and start in the opposite direction, the above-described operation would be repeated.

I do not wish in any way to limit myself to the particular construction as shown in the above-mentioned drawings, which are given merely as an example of one form of apparatus embodying my invention and which may be the subject of considerable alteration without departing from the principle of the invention.

Having thus described my improvements, what I consider novel, and wish to secure by Letters Patent, is as set forth in the following claims.

I claim—

1. The combination with a dynamo and its armature driven from a variable and reversible source of motion; a pole-changing switch responsive to reversal of direction of rotation of the armature causing a current of uniform polarity to be supplied to the mains, said switch being operated by frictional contact with one or more movable members, the motion of which is subject to reversal with the direction of rotation of the armature; of a locking mechanism whereby the pole-changer may be held from movement, and a centrifugal governor adapted to break the frictional contact and to operate the locking mechanism to hold the pole-changer from movement as long as the speed of the armature remains above a predetermined degree, substantially as set forth.

2. In an electric-lighting system for cars comprising electric lamps, a storage battery and a generator driven by power derived from the motion of a car, the combination of an electric switch adapted to reverse the connections between the generator and the battery-mains upon the reversal of direction of rotation of the armature, said switch being operated by frictional contact with a movable member or members, the direction of motion of which is reversed with the direction of rotation of the armature, with a centrifugal governor adapted to break said frictional contact at a predetermined speed and to complete the dynamo-circuit through the battery at a higher predetermined speed, and independent spring mechanisms whereby the two operations may be independently adjusted; substantially as set forth.

3. The combination with a dynamo and its armature, an electrical switch and a centrifugal governor adapted to close and open said switch upon an increase or decrease in speed above or below predetermined limits respectively, of a spring mechanism whereby said opening or closing movements of the switch will be independently completed when in a certain degree carried out by the action of said centrifugal governor substantially as described.

In testimony of all which I have hereunto subscribed my name.

JOHN L. CREVELING.

Witnesses:
  H. G. DARWIN,
  ELMER E. ALLBEE.